United States Patent [19]

Buccicone et al.

[11] Patent Number: 4,961,443

[45] Date of Patent: Oct. 9, 1990

[54] HANDLE ASSEMBLY

[75] Inventors: Dana F. Buccicone, Kohler; Thomas E. Gaffney; Clarence E. Klessig, both of Sheboygan; Alan J. Weir, New Holstein, all of Wis.

[73] Assignee: Kohler Co., Kohler, Wis.

[21] Appl. No.: 449,687

[22] Filed: Dec. 12, 1989

[51] Int. Cl.⁵ .............................................. F16K 31/60
[52] U.S. Cl. ..................................... 137/315; 137/359; 251/292; 16/114 R; 16/DIG. 24; 16/DIG. 30; 14/548
[58] Field of Search ................ 137/315, 359; 251/291, 251/292; 16/111 R, 114 R, 121, DIG. 24, DIG. 30; 74/548, 553, 557; 403/361, 359

[56] References Cited

U.S. PATENT DOCUMENTS

| | | | |
|---|---|---|---|
| 1,601,824 | 10/1926 | Goldsmith et al. | 74/548 X |
| 1,605,457 | 11/1926 | Muend | 137/359 X |
| 1,654,550 | 1/1928 | Muend | 137/359 |
| 1,701,776 | 2/1929 | Hinman | 16/121 |
| 1,707,353 | 4/1929 | Fraser | 251/292 X |
| 1,800,981 | 4/1931 | Beste | 251/291 X |
| 1,823,496 | 9/1931 | Lehnert | 251/291 X |
| 2,142,791 | 1/1939 | Koza | 16/DIG. 30 X |
| 3,301,580 | 1/1967 | Greitzer | 16/121 X |
| 3,582,116 | 6/1971 | Young | 16/121 X |
| 3,791,402 | 2/1974 | Shuler | 137/315 |
| 3,965,528 | 6/1976 | Kissler | 16/110 R |
| 4,306,468 | 12/1981 | Bolgert | 74/548 |
| 4,349,940 | 9/1982 | Fleischmann et al. | 16/114 R X |
| 4,479,736 | 10/1984 | Evans et al. | 16/114 R X |
| 4,515,037 | 5/1985 | Block | 74/553 |
| 4,519,581 | 5/1985 | Paul | 137/315 X |
| 4,525,894 | 7/1985 | Knapp | 16/111 R |
| 4,565,350 | 1/1986 | Rozek | 251/292 |
| 4,593,430 | 6/1986 | Spangler et al. | 16/121 |
| 4,616,673 | 10/1986 | Bondar | 137/315 |
| 4,766,642 | 8/1988 | Gaffney et al. | 16/121 |
| 4,794,945 | 1/1989 | Reback | 137/315 |
| 4,842,009 | 6/1989 | Reback | 137/315 |

*Primary Examiner*—John Rivell
*Attorney, Agent, or Firm*—Quarles & Brady

[57] ABSTRACT

A handle assembly which is attachable to a conventional valve stem and includes a decorative handle member is disclosed. In a preferred embodiment, an adapter element has an interior splined surface that mounts on the valve stem. The adapter also includes external splines and an annular flange. The adapter is positioned within a central opening in an escutcheon. A mounting screw fastens the adapter to the valve stem, with the escutcheon trapped beneath the adapter due to the presence of the annular flange. A post member has internal splines which engage the external splines of the adapter so that the parts rotate together. In addition, the post member has external splines which engage a splined opening in a handle. The handle comprises a bottom lever bar and a top lever bar. A strap cap is positioned over the handle and has a threaded hole to receive an upwardly-directed bolt. The bolt presses the handle between the strap cap and the post member. In the final step of assembly, a threaded surface on the escutcheon is rotatively engaged with a threaded surface on the post member, thereby pressing the adapter element between the escutcheon and the post member.

9 Claims, 3 Drawing Sheets

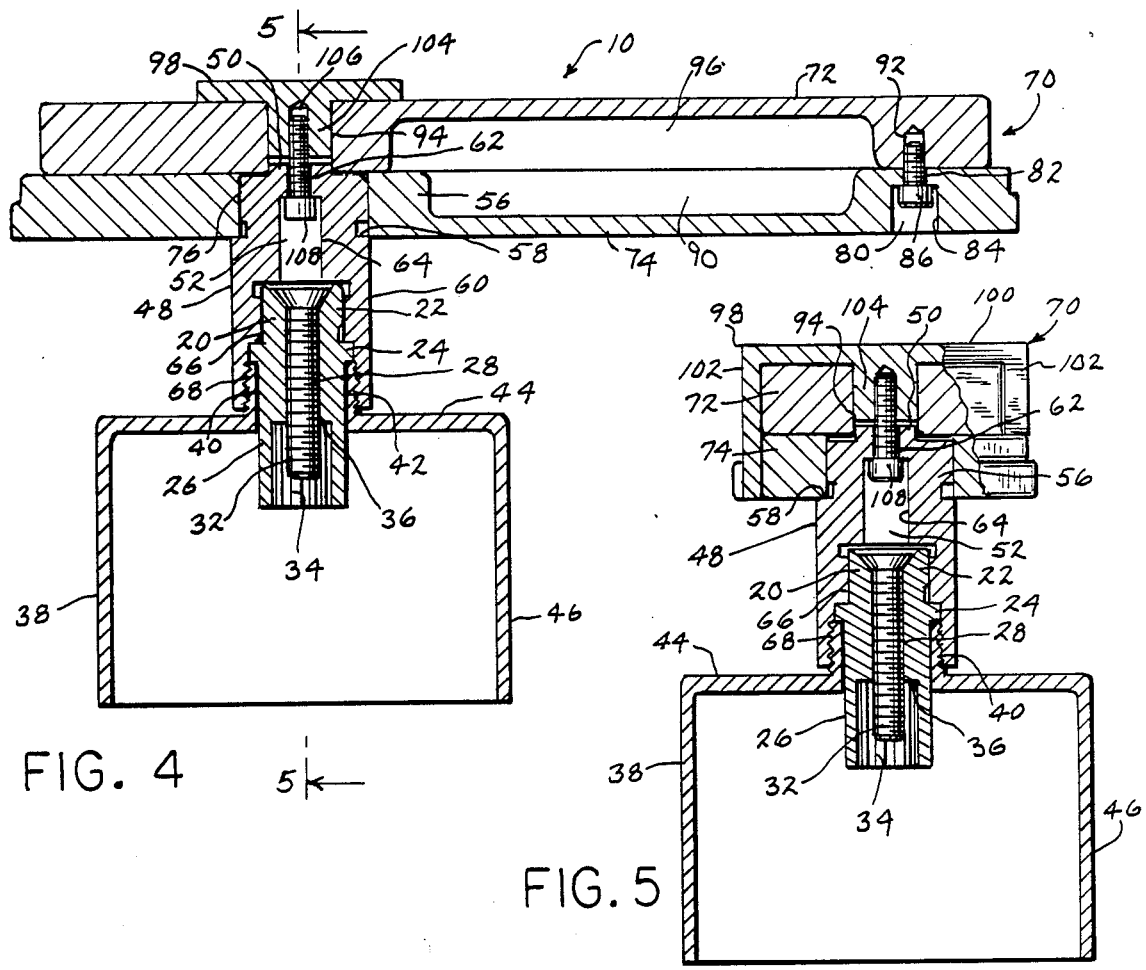
FIG. 4
FIG. 5
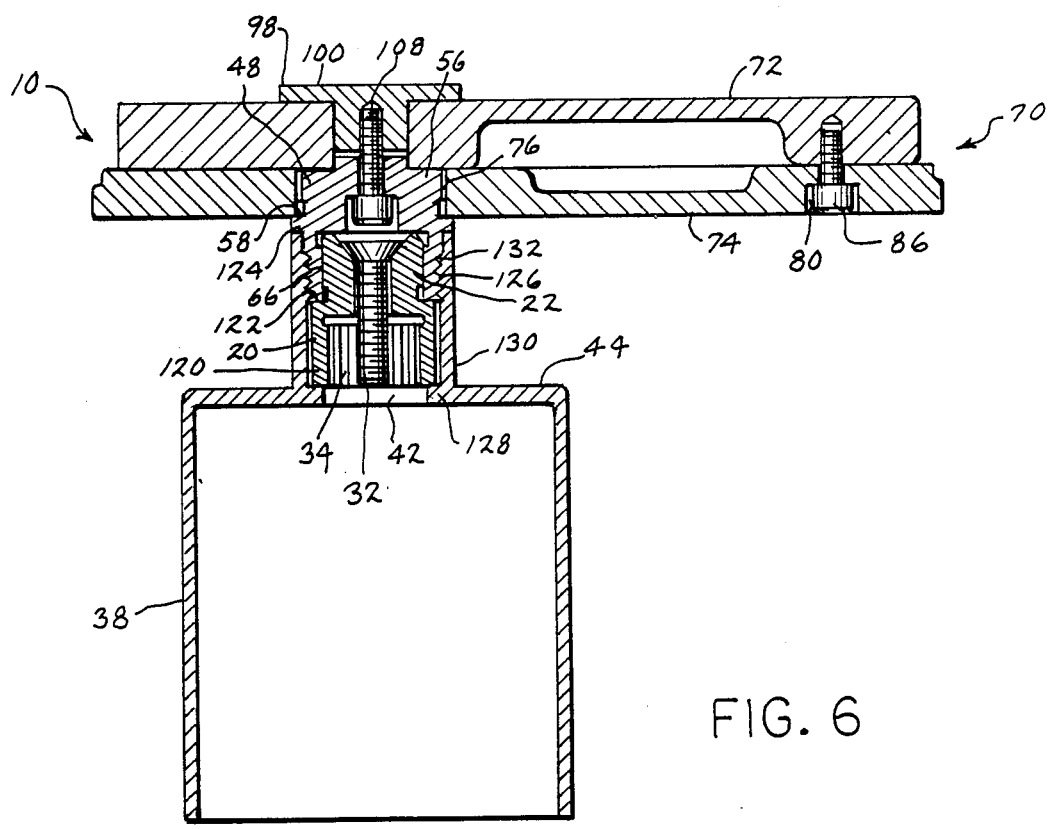
FIG. 6

HANDLE ASSEMBLY

FIELD OF THE INVENTION

This invention relates to faucet handle assemblies, and more specifically, to a concealable handle assembly which is attachable to a conventionable, rotatable valve stem. The invention is especially useful in allowing a lever type handle to be operatively connected to the valve stem without having exterior access holes and screws within normal view, and also in permitting the lever to be easily replaced and adjusted without inviting vandlism.

BACKGROUND OF THE INVENTION

Commonly, faucet assemblies incorporate removable covers which snap in place on the handle to hide the attachment screw (see for example U.S. Pat. Nos. 4,842,009 and 4,616,673). Use of such snap covers may detract from the decorative appearance of the handle. Furthermore, vandals may readily remove the snap covers. Also, for some applications, such as in public facilities, it is desirable to have handle assembly that hides the attachment screw from view and that does not visually disclose the means of disassembling the faucet.

Various other handle assemblies suffer from problems with cost of manufacture, ease of assembly, or alignment of the lever arm with the front of the sink when the valve is in the closed position. Solving these problems are difficult to achieve while also solving problems in affixing the snap cap.

It can therefore be seen that a need exists for an improved handle assembly.

SUMMARY OF THE INVENTION

The present invention provides a handle assembly that can be attached to a rotatable stem. The handle assembly includes an adapter element that is fixedly mounted on the valve stem so that the two rotate together. The adapter element has an outer engagement surface. An escutcheon is mounted on the adapter and has a threaded portion and a central opening. The central opening is sized so as not to permit the adapter element to pass completely through the opening. A post member has a first engagement surface and a second engagement surface. The second engagement surface is adapted to engage the outer engagement surface of the adapter element. Due to the engagement of the second engagement surface and the outer engagement surface, the post member rotates with the adapter element. The post member also has a threaded portion that rotatively engages the threaded portion of the escutcheon. The threaded portions of the post member and the escutcheon rotatively engage to sandwich the adapter element between the escutcheon and the post member. A handle having an interior engagement surface is adapted to engage the first engagement surface of the post member. Engagement of the interior engagement surface and the first engagement surface causes the post member to rotate with the handle. The handle assembly also employs an upwardly-directed bolt to secure the post member to the handle.

This aspect of the invention yields a faucet handle having the screw holes and screws normally concealed from view when the handle is assembled. The upwardly-directed bolt is concealed from view without the need for friction covers. Additionally, the escutcheon must be rotatively disengaged from the post member to disassemble the handle. This fact is not readily apparent upon visual inspection of the handle assembly, and therefore the risk of vandalism is reduced.

The handle assembly may also include a strap cap that is positionable over the handle. The strap cap has a threaded screw hole for receiving the upwardly-directed bolt. In this way, the handle is pressed between the strap cap and the post member. This aspect of the invention allows the handle to be easily replaceable and permits the handle to be comprised of more than one component. Also, handles of different sizes, shapes and colors may be pressed between the strap cap and the post member.

Thus, it is an object of the invention to provide an improved handle assembly that operatively attaches to a conventional valve stem without having screw holes and screws within normal view.

It is another object of the invention to provide a handle assembly that is easily assembled without using snap fit components and that incorporates a method of disassembly that is not readily obvious to a person viewing the assembly.

It is another object of the invention to provide a handle assembly for a faucet where a decorative handle or lever member can be simply removed and replaced by a decorative member having a different size, shape or color.

The foregoing and other objects and advantages of the present invention will appear from the following description. In the description, reference will be made to the accompanying drawings which illustrate preferred embodiments of the present invention. These embodiments do not represent the full scope of the invention. Reference should therefore be made to the claims herein for interpreting the full scope of the invention.

BRIEF DESCRIPTION OF THE DRAWINGS

FIG. 4 is a view in horizontal section of the assembled handle assembly as shown in FIG. 1;

FIG. 5 is a view in vertical section of the handle assembly taken in the plane 5—5 of FIG.4; and FIG. 6 is a view similar to that of FIG. 4, but showing an alternate embodiment of the invention.

DETAILED DESCRIPTION OF THE PREFERRED EMBODIMENTS

Figure 1:
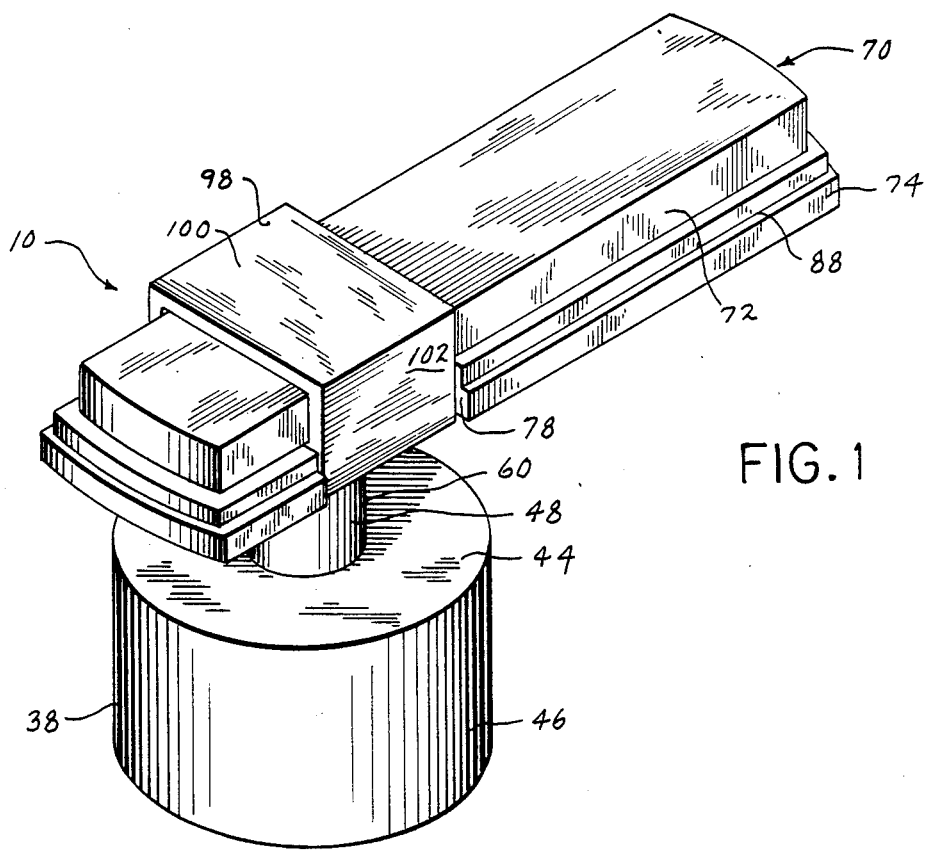
FIG. 1 is a perspective view of a handle assembly embodying the invention.
Figure 2:
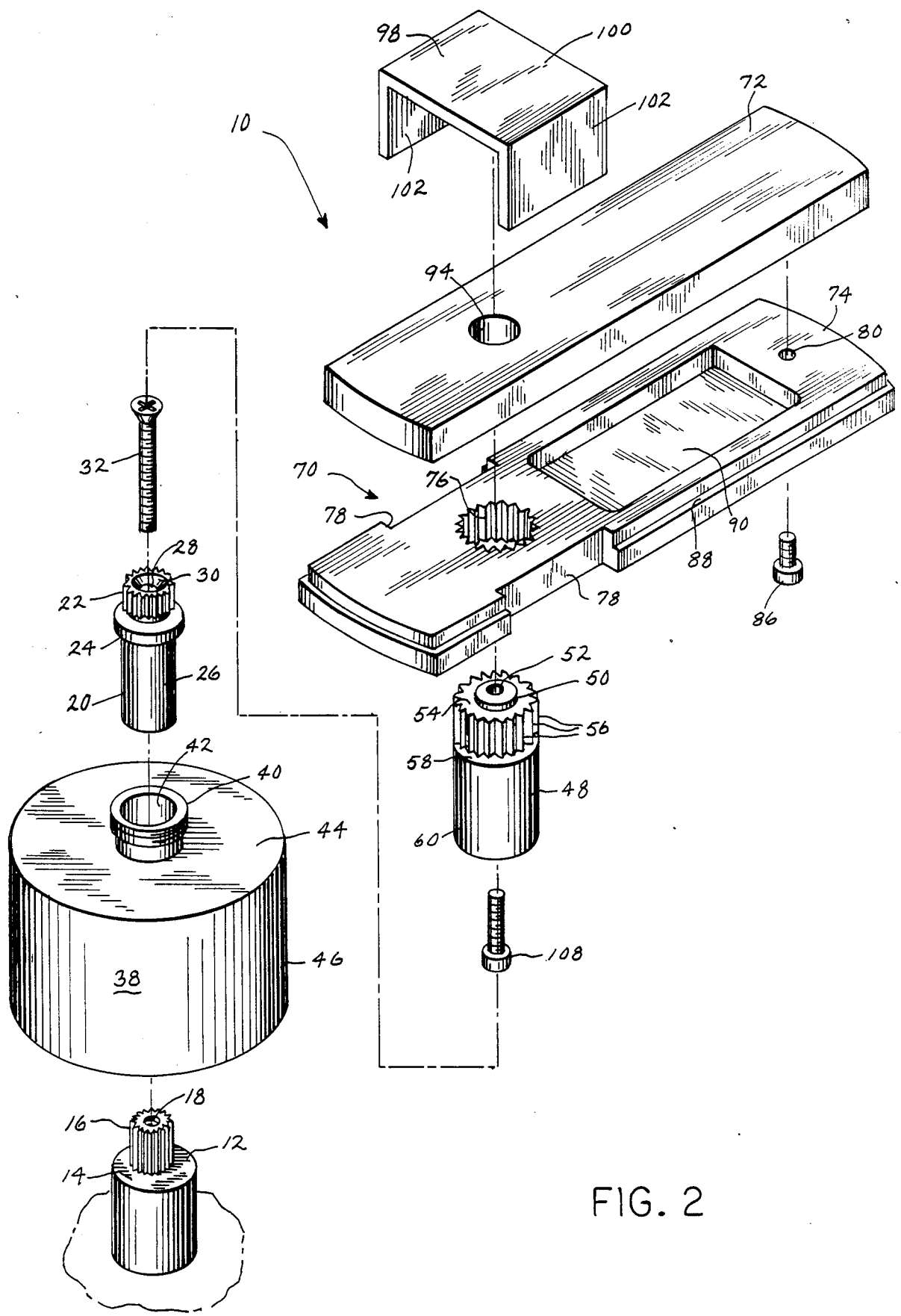
FIG. 2 is an exploded perspective view of the components of the handle assembly of FIG. 1, along with top part of a valve stem.

Referring to FIGS. 1 and 2, a preferred embodiment of an assembly 10 is shown for use with a conventional valve stem 12. The valve stem 12 has a shoulder surface 14, twenty external splines 16 extending upward therefrom and radially, and a central threaded screw hole 18. Throughout this description, terms such as up and down will be in reference to the orientation of the components as shown in FIG. 2. It should be understood, however, that for wall mounted valve stems, the up direction should be read as the outward direction.

An adapter element 20 is formed with nineteen external upper splines 22. The adapter element 20 has twenty internal splines 34 (FIG. 4) that mate with the twenty external splines 16 of the valve stem 12. An annular flange 24 is located below the splines 22, with a body portion 26 below that. The adapter element 20 also has a longitudinally extending central opening 28. Adjacent the top of the adapter 20, the central opening 28 is tapered 30 to countersink the head of a downwardly-directed mounting screw 32. The diameter of the central opening 28 narrows above the splines 34 at a step surface 36.

A rotatable escutcheon 38 has a threaded upper, outer neck portion 40 that surrounds a central hole 42 (FIG. 2). The hole 42 is appropriately sized to accommodate the body portion 26 of the adapter element 20, but not to accommodate the annular flange 24. The escutcheon 38 has a radial shoulder 44 that extends outward from the neck portion 40. An annular skirt portion 46 extends downward from the periphery of the shoulder 44.

The handle assembly 10 also includes post member 48 that is formed with a head 50. The head 50 surrounds a central opening 52 that extends longitudinally through the post member 48. A top surface 54 extends radially outward from the head 50. Nineteen external splines 56 are positioned on the outside of the post member 48. A step 58 is located between the splines 56 and a main cylindrical portion 60 of the post member 48.

Figure 3:
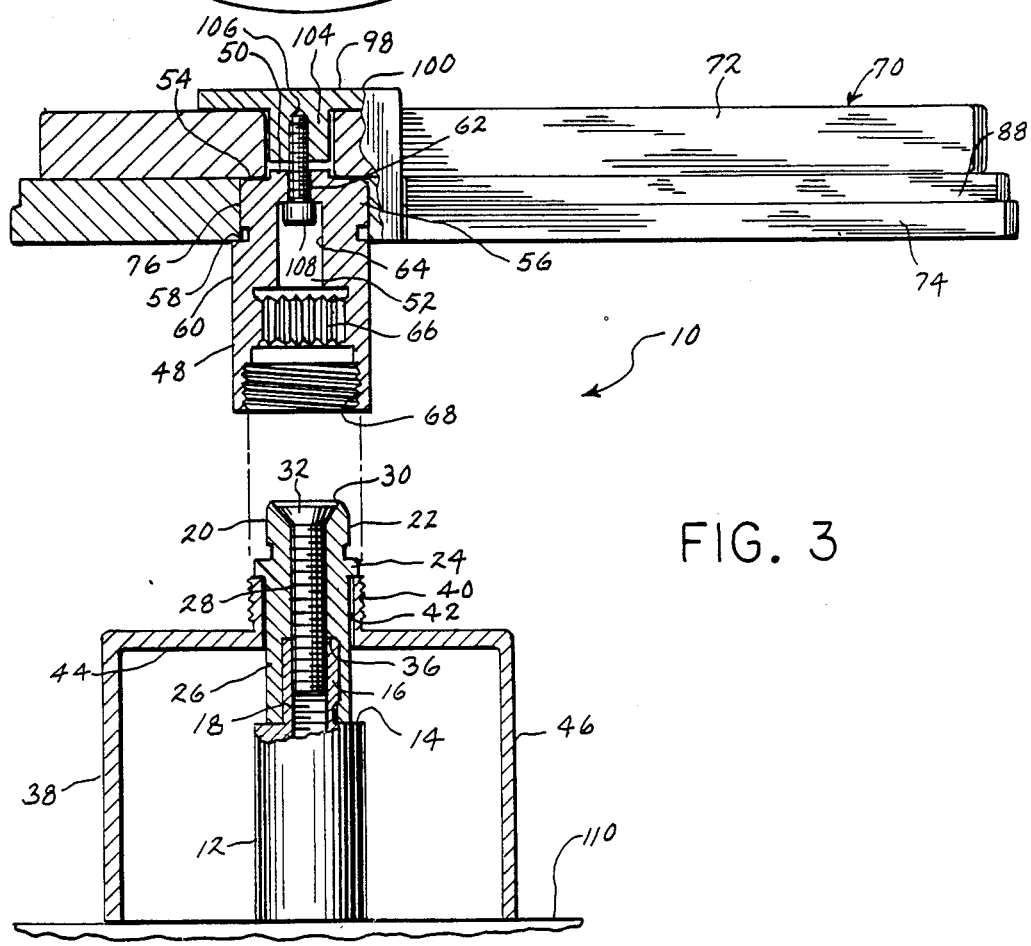
FIG. 3 is a partially sectioned view of the components and valve stem of FIG. 2, with the components shown in an intermediate stage of assembly.

As best shown in FIGS. 3-5, the central opening 52 of the post member 48 becomes increasingly wider from its top to its bottom. Adjacent the top, the opening 52 has a narrow portion 62 which below widens into an intermediate portion 64. The opening 52 also includes nineteen internal splines 66 located beneath the intermediate portion 64. Adjacent the bottom of the post member 48, the opening 52 includes internal threads 68. The threaded portion 68 of the opening 52 is wider than the internal splined area 66.

A handle member 70 preferable consists of a top lever bar 72 and bottom lever bar 74. The bottom bar 74 has an internal splined opening 76 which is sized to mate with the external splines 56 of the post member 48. For decorative purposes, the bottom bar 74 includes a generally stepped periphery 88. Adjacent both sides of the opening 76, the periphery of the handle member 70 has recessed portions 78. A hole 80 through the bar 72 comprises an upper bolt bore 82 (FIG.4) and a lower bolt bore 84. The upper bore 82 is a smaller diameter than the lower bore 84. The lower bore 84 is designed to house the head of a bolt 86. The bottom bar 74 also includes a hollowed-out portion 90 in order to minimize the material needed to construct the bar 74.

The top lever bar 72 is designed to fasten on top of the bottom bar 74. To this end, the top bar 72 includes a threaded bolt hole 92 and a through hole 94. When the top bar 72 is positioned relative to the bottom bar 74 as shown in FIG. 4, the threaded hole 92 is aligned with hole 80 in the bottom bar 74. Further, the center of the through hole 94 is then in line with the center of the internal splined opening 76 of the bottom bar 74. The through hole 94 has a smaller diameter than that of the splined opening 76, but a larger diameter than the head 50 of the post member 48. The top lever bar 72 also includes a hollowed out portion 96 (FIG. 4) to minimize the material necessary to construct that bar.

The handle assembly 10 also includes a U-shaped strap cap 98 which is designed to fit over the handle member 70. The strap cap 98 has top surface 100 and two opposite side walls 102 extending downward therefrom. A circular knob 104 extends downward from beneath the center of the top surface 100. The knob 104 is sized to fit within the through hole 94 in the top lever bar 72. A threaded bolt hole 106 formed in the knob 104 is adapted to receive an upwardly-directed bolt 108. It will be apparent to one skilled in the art that other types of fasteners, such as screws, pins or rivets, may be used in place of the bolt 108. The assembly of the handle components and their operation will now be described.

An initial step in assembling the handle assembly 10 is to form the handle member 70 and complete a first subassembly as illustrated in the upper portion of FIG. 3. To do so, the top lever bar 72 is positioned as shown in FIG. 2 with respect to the bottom lever bar 74. The top and bottom bars 72 and 74 are then fastened together by bolt 86. The bolt 86 is upwardly-directed into hole 80. The bolt 86 extends through the hole 80 and into the threaded hole 92 of the top lever bar 72. Rotation of the bolt 86 by the appropriate tool draws the top and bottom bars 72 and 74 together, and causes the head of bolt 86 to seat in the lower bore 84 of the hole 80.

The post member 48 is then moved upwardly into the handle member 70 so that the external splines 56 insert into and mate with the internal splined opening 76 of the bottom lever bar 74. Upward movement is halted when the step 58 contacts the bottom of the inwardly-directed splines of the opening 76. As seen in FIGS. 3-5, a portion of the head 50 extends above the bottom lever bar 74. The size of the head 50 is designed to fit into the through hole 94 of the top lever bar 72.

The strap cap 98 is now added to the first subassembly by aligning the downwardly extending side walls 102 over the top lever bar 72 and into the recessed portions 78 of the bottom bar 74. The recessed portions 78 are sufficiently large to accommodate the width of the side walls 102. The circular knob 104 inserts into the through hole 94 of the top bar 72. To complete this subassembly, the upwardly-directed bolt 108 is inserted into the central opening 52 of the post member 48. The threads of the bolt 108 align with the bolt hole 106 in the knob 104. By using an elongated (thin) tool, the bolt 108 is rotatively inserted into the bolt hole 106. This draws the post member 48 toward the strap cap 98 and presses the handle member 70 (both the top lever bar 72 and the bottom lever bar 74) between the post member 48 and the strap cap 98. The subassembly functions as a unit, where rotation of the handle member 70 also rotates the post member 48. It will be apparent from the foregoing that many different handles or levers may be substituted for the handle member 70 illustrated and pressed between the strap cap 98 and the post member 48.

The second subassembly, consisting of the adapter element 20, the escutcheon 38 and mounting screw 32 (illustrated in the lower portion of FIG. 3), is mounted on the valve stem 12. The adapter element 20 is first lowered into the central hole 42 of the escutcheon 38. The body portion 26 slidably fits within the hole 42. Lowering of the adapter 20 into the central hole 42 is halted when the top of the neck portion 40 contacts the annular flange 24.

The adapter element 20 and the escutcheon 38 are next positioned over and lowered onto the valve stem 12. The twenty internal splines 34 of the adapter element 20 mate with the twenty external splines of the valve stem 12. The downwardly-extending mounting screw 32 is inserted into the central opening 28 of the adapter and rotated so that the mounting screw 32 threadably engages the screw hole 18 of the valve stem 12. As illustrated in FIG. 3, the mounting screw 32 can be inserted into the valve stem 12 until the adapter 20 comes in contact with the shoulder surface 14 of the valve stem 12 and/or the top of the valve stem splines 16 contact the step surface 36 in the central opening 28 of the adapter 20. With the mounting screw 32 in place, the adapter element 20 and the valve stem 12 rotate as a unit, and are axially fixed relative to each other. It is important that the escutcheon 38 remain free to rotate relative to the adapter 20. Thus, there should be sufficient space between the annular flange 24 of the adapter 20 and a mounting surface 110 (FIG. 3) to prevent the escutcheon 38 from being pinched when the mounting screw 32 is fully inserted.

The first and second subassemblies are connected by lowering the post member 48 over the adapter element 20 so that the external splines 22 of the adapter 20 insert into the central opening 52 of the post member 48. The assemblies are positioned so that the external splines 22 engage the internal splines 66. Upward movement of the adapter 20 into the opening 52 is halted when the annular flange 24 contacts the bottom of the splines 66 because the annular flange 24 is sized to fit within the threaded portion 68 but not within the narrower splined area 66. With the external splines 22 of the adapter element 20 mated with the internal splines 66 of the post member 48, the adapter 20 and the post member 48 rotate together.

At this point in the assembly, the position of the handle member 70 relative to the valve stem 12 can be adjusted by removing the post member 48 from engagement with the adapter 20 and rotating the handle member 70 to another position where the splines (external splines 22 and internal splines 56) will fit together. This is done, for example, when the user desires the handle member 70 to point in a given direction when the fluid supply is closed. To achieve a further refinement of the handle position, the adapter 20 can be removed from the valve stem 12 and rotated to the next spline engaging position. A wide variety of handle member 70 positions are possible because the adapter/valve stem spline configuration employs twenty splines and the adapter/post member spline configuration employs nineteen splines.

To complete the assembly, the escutcheon 38 is slidably raised about the body portion 26 of the adapter element 20 until the neck portion 40 contacts the post member 48. The escutcheon 38 is then rotated about the body portion 26 so that the threaded neck portion 40 mates with the internal threads 68 in the opening 52 of the post member 48. The escutcheon 38 thus moves upwardly relative to the post member 48 along the axial direction of the valve stem 12. The escutcheon 38 is rotated until the annular flange 24 is pressed between the bottom of the internal splines 66 of the post member 48 and the neck portion 40 of the escutcheon 38 (see FIGS. 4 and 5). The components of the handle assembly 10 are now firmly in place and mounted on the valve stem 12 to provide a handle assembly for a faucet where exterior access holes and screws are concealed from normal view. Only hole 80 and bolt 86 are on the exterior of the handle assembly 10, but they are normally not visible because they are located on the underside of the bottom lever bar 74 and the bolt 86 is countersunk into the hole 80. The skirt portion 46 of the escutcheon 38 also functions in this regard by concealing from view the valve stem 12 and the connections thereto.

The assembled handle functions in a manner comparable to standard faucet handles. Rotation of the handle member 70 rotates the post member 48 due to the splines 56 of the post member 48 being engaged with the splined opening 76. Any rotation of the handle member 70 is also imparted to the adapter element 20 because the external adapter splines 22 are engaged with the internal splines 66 of the post member 48. In a like manner, the rotation causes the valve stem 12 to rotate because the external splines 16 of the valve stem 12 are mated with the internal splines 34 of the adapter element 20. Thus, when the handle member 70 is turned, the spline configurations within the handle assembly 10 force the valve stem 12 to rotate in the usual manner, affecting the fluid flow for the faucet.

An alternate embodiment of the handle assembly 10 is shown in FIG. 6. Features of the handle assembly 10 that are the same as those previously described have the same reference numerals. In this embodiment, the adapter element 20 is formed with a barrel portion 120. The barrel portion 120 is wider than the external splines 22, and thereby forms an annular abutment surface 122. As in the preferred embodiment, the adapter 20 has internal splines 34 that mate with the external splines 16 of the valve stem 12 (not shown in FIG. 6).

The post member 48 has also been modified to include an annular stop surface 124 located below the step 58 and the external splines 56. Beneath the stop surface 124, the post member 48 has external threads 126. As previously, the post member 48 has internal splines 66 that mate with the external splines 22 of the adapter element 20, and external splines 56 that mate with the internal splined opening 76 of the bottom lever bar 74.

The escutcheon 38 has been modified by incorporating an inwardly-directed annular ridge 128. A neck portion 130 extends upward from the radial shoulder 44 and includes inner threads 132. The neck portion 130 is sized to fit around the adapter element 20 and to permit the inner threads 132 to engage the external threads 126 of the post member 48.

Assembly of the handle assembly embodiment shown in FIG. 6 proceeds in generally the same manner as described for the preferred embodiment. In the alternate embodiment, upward movement of the post member 48 into the internal splined opening 76 of the bottom bar 74 is halted when the stop surface 124 comes into contact with the underside of the bottom bar 74. By threadably engaging the upwardly-directed bolt 108, the handle member 70 is pressed between the underside of the top surface 100 of the strap cap 98 and the stop surface 124 of the post member 48.

The adapter element 20 is connected to the valve stem 12 (not shown in FIG. 6) in a similar manner as previously described. The adapter 20 is first lowered into the neck portion 130 of the escutcheon 38. Note that the barrel portion 120 of the adapter 20 does not fit within the annular ridge 128 of the escutcheon, and therefore the adapter 20 does not pass through the central hole 42 of the escutcheon 38. The adapter 20 and the escutcheon 38 are fastened to the valve stem 12 using mounting screw 32. In this way, the escutcheon 38 is trapped beneath the adapter 20 due to the inwardly-directed ridge 128.

Assembly is completed by raising the escutcheon 38 and rotatively engaging the inner threads 132 of the escutcheon 38 with the external threads 126 of the post member 48. The adapter element 20 is then pressed between the ridge 128 and the bottom of the post member 48.

Disassembly of either embodiment of the handle assembly is fast and uncomplicated. Rotating the escutcheon 38 will disengage the escutcheon 38 from its threaded relationship with the post member 48. This will separate the handle assembly 10 into the two subassemblies and will expose both the upwardly-directed bolt 108 and the mounting screw 32 which will enable one to further disassemble either subassembly. From the subassembly stage, the handle member 70 can be easily removed and replaced with another decorative handle (not shown) of a different size, shape or color. The replacement handle or lever need only engage the external splines 56 of the post member 48 to rotate therewith, and permit the upwardly-directed bolt 108 to secure the replacement handle to the post member 48. By removing bolt 108, the handle member 70 is released from its pressed engagement between the strap cap 98 and the post member 48.

The foregoing detailed description has been for the purpose of illustration. Thus, a number of modifications and changes may be made without departing from the spirit and scope of the present invention. For example, the top lever bar 72 and the bottom lever bar 74 could be integrally formed. Also, as discussed above, terms in the claims such as upper and lower are intended as relative terms and are meant to cover such assemblies regardless of direction of final assembly relative to true vertical. Therefore, the invention should not be limited by the specific embodiments described, but only by the claims.

We claim:

1. A handle assembly attachable to a rotatable stem, comprising:
    an adapter element fixedly mountable on the stem to rotate therewith, said adapter element having an outer engagement surface;
    an escutcheon mounted on the adapter and having a threaded portion and a central opening, said central opening sized so as not to permit said adapter element to pass completely therethrough;
    a post member having:
        (a) a first upper engagement surface;
        (b) a second lower engagement surface adapted to engage said outer engagement surface of said adapter element, the engagement of said second engagement surface and said outer engagement surface causing said post member to rotate with said adapter element; and
        (c) a threaded portion for rotatively engaging said threaded portion of said escutcheon, said threaded portion of said post member and said threaded portion of said escutcheon rotatively engageable to sandwich said adapter element between said escutcheon and said post member;
    a handle having an interior engagement surface adapted to engage said first engagement surface of said post member, the engagement of said interior engagement surface and said first engagement surface causing said post member to rotate with said handle; and
    an upwardly-directed bolt for securing said handle to said post member.

2. The handle assembly according to claim 1, further comprising a strap cap positionable over said handle, said strap cap having a threaded screw hole for receiving said upwardly-directed bolt.

3. The handle assembly according to claim 2, wherein said handle is sandwiched between said strap cap and said post member.

4. The handle assembly according to claim 3, wherein:
    said handle includes a top lever bar and a bottom lever bar; and
    said interior engagement surface of said handle is located on said bottom lever bar.

5. The handle assembly according to claim 4, wherein:
    said strap cap has a top surface and a knob extending downward therefrom;
    said threaded screw hole is located within said knob; and
    said top lever bar contains a through hole that is sized to receive said knob.

6. The handle assembly according to claim 1, wherein:
    said threaded portion of said escutcheon has outwardly-directed threads; and
    said threaded portion of said post member has inwardly-directed threads.

7. The handle assembly according to claim 1, wherein:
    said threaded portion of said escutcheon has inwardly-directed threads; and
    said threaded portion of said post member has outwardly-directed threads.

8. The handle assembly according to claim 1, wherein:
    said post member has a top end, an opposite bottom end, and a longitudinal central opening extending from said top end to said bottom end;
    said central opening has a first bore section and an adjacent second bore section, said first bore section being wider than said second bore section and being located adjacent said bottom end;
    said second engagement surface of said post member is located in said second bore section; and
    said threaded portion of said post member is located in said first bore section.

9. The handle assembly according to claim 8, wherein:
    said central opening has a third bore section and an adjacent fourth bore section, said fourth bore section being narrower than said third bore section and being located adjacent said top end of said post member; and
    the head of said upwardly-directed bolt is sized to fit within said third bore section but not within said fourth bore section.

* * * * *